(12) United States Patent
Komeya et al.

(10) Patent No.: US 7,612,006 B2
(45) Date of Patent: Nov. 3, 2009

(54) CONDUCTIVE SILICON NITRIDE MATERIALS AND METHOD FOR PRODUCING THE SAME

(75) Inventors: Katsutoshi Komeya, Kanagawa (JP); Junichi Tatami, Kanagawa (JP); Takeshi Meguro, Kanagawa (JP); Tomofumi Katashima, Kanagawa (JP); Toru Wakihara, Kanagawa (JP)

(73) Assignee: Yokohama TLO Company, Ltd., Kanegawa (JP)

( * ) Notice: Subject to any disclaimer, the term of this patent is extended or adjusted under 35 U.S.C. 154(b) by 167 days.

(21) Appl. No.: 11/664,072

(22) PCT Filed: Sep. 27, 2005

(86) PCT No.: PCT/JP2005/017701

§ 371 (c)(1),
(2), (4) Date: Mar. 27, 2007

(87) PCT Pub. No.: WO2006/038489

PCT Pub. Date: Apr. 13, 2006

(65) Prior Publication Data

US 2008/0076657 A1   Mar. 27, 2008

(30) Foreign Application Priority Data

Oct. 1, 2004   (JP)   ............... 2004-290328
Dec. 27, 2004   (JP)   ............... 2004-376116

(51) Int. Cl.
  *C04B 35/584*   (2006.01)
  *C04B 35/78*   (2006.01)
(52) U.S. Cl. ............... 501/97.2; 501/97.3; 501/97.4; 501/99; 501/100; 252/506; 252/507; 252/520.22; 252/521.3

(58) Field of Classification Search ............... 501/97.1, 501/97.2, 97.3, 97.4; 252/506, 507, 520.22, 252/521.3
See application file for complete search history.

(56) References Cited

U.S. PATENT DOCUMENTS 7,306,828 B2 *  12/2007  Barrera et al. ............... 427/427

(Continued)

FOREIGN PATENT DOCUMENTS

JP   2004-002067   1/2004

(Continued)

OTHER PUBLICATIONS

Balazsi et al., "Manufacture and examination of C/Si3N4 Nanocomposites", J. Eur. Ceramic Soc. 24 (2004) 3287-3294.

(Continued)

*Primary Examiner*—Karl E Group
(74) *Attorney, Agent, or Firm*—Gary C Cohn PLLC

(57) ABSTRACT

To provide a sintered silicon nitride with conductivity and densification, an oxide of titanium group elements, such as titanium oxide, hafnium oxide, zirconium oxide and the like, aluminum oxide and/or aluminum nitride is added as needed to silicon nitride-oxidant of rare-earth elements-aluminum oxide system or silicon nitride-oxide of rare-earth elements-magnesia system, and then specified quantity of carbon nonotube (CNT) is added to the above mixture. CNT generates silicon carbide after the reaction with contiguous or proximal silicon nitride and the like depending on the sintering duration at high temperature. Since silicon carbide is generated along with nanotubes, the silicon carbide functions as conductor with excellent heat resistance, corrosion resistance and the like.

13 Claims, 2 Drawing Sheets

U.S. PATENT DOCUMENTS

2004/0029706 A1    2/2004    Barrera

FOREIGN PATENT DOCUMENTS

| JP | 2004-244273 |   | 9/2004 |
| --- | --- | --- | --- |
| JP | 2006182590 | * | 7/2006 |
| JP | 2007297231 | * | 11/2007 |

OTHER PUBLICATIONS

Balazsi et al., "Preparation and characterization of carbon nanotube reinforced silicon nitride composites", Mater. Sci. and Engin C 23 (2003) 1133-1137.

* cited by examiner

CONDUCTIVE SILICON NITRIDE MATERIALS AND METHOD FOR PRODUCING THE SAME

FIELD OF THE INVENTION

The present invention relates to a sintered silicon nitride, containing conductive sintered material comprising silicon nitride as a major component and carbon nanotubes (hereinafter referred to as CNT), and their production method. The sintered silicon nitride is applicable to wear resistant components, resistors and the like.

BACKGROUND OF THE INVENTION

Since silicon nitride has outstanding properties in heat resistance, high strength, wear resistance, thermal shock resistance and the like, it attracts attention as engineering ceramics and it has been in practical use for various roll materials such as bearing members and rolling; vanes for compressor, turbo rotors, cutting instruments and the like.

Since the silicon nitride is sintering resistant materials, various additives as well as sintering additives are used for forming sintered bodies. Silicon nitride-rare-earth oxide-aluminum oxide systems, silicon nitride-rare-earth oxide-aluminum oxide-titanium oxide systems and the like are known as the main component systems. In these components, such sintered additives as rare-earth oxide are components for generating grain boundary phase (glass phase) comprising Si—R—Al—O—N compounds (R represents rare-earth elements) and the like during sintering and for developing high strength by densification of sintered bodies.

In the above sintered silicon nitride, addition of sintered additives is a contributing factor for practical application of the material by increasing bending strength, fracture toughness, thermal shock resistance, wear resistance and the like thereof. However, since the material is essentially electric insulator, the material results in sources of various troubles by generating static electricity during their use, causing accretion of fine powders and injuring the accompanied metal. Therefore, development of conductive silicon nitride ceramics is strongly required.

Under the above purpose, there are some examples of research investigating the addition of titanium diboride ($TiB_2$) and zirconium diboride ($ZrB_2$) to silicon nitride-rare earth oxide-aluminum oxide systems. However, the above case requires addition of fairly large amount of electric conductors, leads to lose the essential properties of silicon nitride and is not preferable.

Furthermore, addition of conductive carbon has been examined. Since addition of carbon powders requires fairly large amount of carbon, it greatly inhibits densification of a silicon nitride-sintered additive system and makes it very difficult to produce a compact material (Reference 3). Moreover, there is another example, in which carbon fiber (CNT) is added to silicon nitride-rare-earth oxide-aluminum oxide systems. However, densification is more difficult than the use of carbon powders (Reference 1 and 4).

On the other hand, it is known that addition of titanium oxide, hafnium oxide, zirkonium oxide or the like to a silicon nitride-rare-earth oxide-aluminum oxide system increases wear resistance and addition of aluminum nitride as needed also greatly increases sinterability (Reference 2).

Reference 1: U.S. Patent Publication No. 20040029706

Reference 2: Japanese Patent Application Public Disclosure No. 2004-2067

Reference 3: Cs. Balazsi et al., "Manufacture and examination of $C/SiN_4$ nanocomposites", Journal of the European Ceramic Society 2004, vol. 24, p 3287-3294.

Reference 4: Material Science and Engineering C23 (2003) 1133-1137.

PROBLEMS TO BE SOLVED BY THE INVENTION

An object of the present invention is to provide a conductive and dense sintered silicon nitride. More precisely, it is to add carbon nanotubes to a silicon nitride-rare-earth oxide-aluminum oxide system, silicon nitride-rare-earth oxide-magnesia system or silicon nitride-rare-earth oxide-magnesia-aluminum oxide system as conductor to create conductivity, and to provide a sintered material of dense silicon nitride system.

MEANS OF SOLVING THE PROBLEMS

Since addition of carbon nanotubes (CNT) to a sintered silicon nitride generally inhibits sinterbility, densification of solely silicon nitride-rare-earth oxide-aluminum oxide system is difficult. Consequently, hot pressing and HIP are necessarily involved.

The present inventors found that addition of titanium oxide and the like accelerated densification, and further addition of aluminum nitride even more accelerated densification. Moreover the inventors found that addition of CNT to the above systems facilitated densification much easily and produced a sintered silicon nitride with conductivity and with superior mechanical properties (bending strength, toughness, wear resistance and the like).

The use of the above combination enables densification by such production method as normal pressure sintering and ambient pressure sintering without adding external pressure. It is beyond controversy that application of hot pressing and discharge plasma sintering (SPS) enables easy densification.

Accordingly, fundamentals of the present invention are addition of titanium group elements such as titanium oxide, hafnium oxide, zirconium oxide and the like, aluminum oxide and/or aluminum nitride to silicon nitride-rare-earth oxide-aluminum oxide system or silicon nitride-rare-earth oxide-magnesia system as needed and further addition of appropriate amount of carbon nanotubes. As used herein, the phrase sintered silicon nitride is composed of silicon nitride crystal grains (solid solution of small amount of Al and O) and grain boundary phase. In other words, all other similar structure to above description in addition to the above systems and additives are acceptable for the present production method.

Moreover, CNT generates silicon carbide (SiC) by reacting with silicon nitride and the like, which is contiguous or proximal to CNT, depending on sintering duration at high temperature. Since silicon carbide is generated alongside of nanotubes in this case, silicon carbide is able to function as conductor with excellent heat resistance, corrosion resistance and the like.

That is, the present invention is a sintered silicon nitride produced by (a) preparing a mixture, comprising (1) 0.5 to 10 weight percent of rare-earth compounds in terms of oxide, (2) 0.1 to 5 weight percent of aluminum oxide or its precursor, (3) 0 to 5 weight percent of aluminum nitride, (4-1) 0.1 to 5 weight percent of oxides of titanium group or other titanium group compounds in terms of equimolar titanium nitride wherein the titanium group compounds can be converted to nitrides of titanium group elements by sintering or (4-2) 0.1 to 5 weight percent of magnesium oxide, and (5) silicon nitride powder as a balance, and further comprising (6) 0.3 to 12 weight percent of CNT relative to 100 weight percent of the previous mixture, wherein the silicon nitride powder has an average grain diameter of less than 1.0 μm and contains less than 1.7 weight percent of oxygen content and more than 90 weight percent of alpha phase type silicon nitride, and (b) sintering the mixture.

Also, a preferable sintered silicon nitride of the present invention is a sintered silicon nitride containing 0.2 to 5 weight percent of nitride grains of titanium group elements with average grain diameter of less than 1.0 μm, 2 to 20 weight percent of grain boundary phase containing mainly Si—R—Al—O—N compounds (R represents rare-earth elements), silicon nitride as remnant and 0.3 to 12 weight percent of CNT to 100 weight percent of the previous mixture; and a sintered silicon nitride including 2 to 20 weight percent of grain boundary phase containing mainly Si—R—Mg—Al—O—N compounds or Si—R—Mg—O—N compounds (R represents rare-earth elements), silicon nitride as remnant and further containing addition of 0.3 to 12 weight percent of CNT to 100 weight percent of the previous mixture.

Moreover, the present invention is a method for producing a sintered silicon nitride, comprising (a) forming a mixture into a desired shape and degreasing thereof, wherein the mixture comprises (1) 0.5 to 10 weight percent of rare-earth compounds in terms of oxide, (2) 0.1 to 5 weight percent of aluminum oxide or its precursor, (3) 0 to 5 weight percent of aluminum nitride, (4-1) 0.1 to 5 weight percent of oxides of titanium group with average grain diameter of less than 1.0 μm or other titanium group compounds in terms of equimolar titanium nitride wherein the titanium group compounds can be converted to nitrides of titanium group elements by sintering or (4-2) 0.1 to 5 weight percent of magnesium oxide with average grain diameter of less than 1.0 μm, and (5) silicon nitride powder as a balance, and further comprising (6) 0.3 to 12 weight percent of CNT relative to 100 weight percent of the previous mixture, wherein the silicon nitride powder has an average grain diameter of less than 1.0 μm and contains less than 1.7 weight percent of oxygen content and more than 90 weight percent of alpha phase type silicon nitride, and (b) sintering the shaped mixture at 1600 to 1900° C.

EFFECTS OF THE INVENTION

Figure 1:
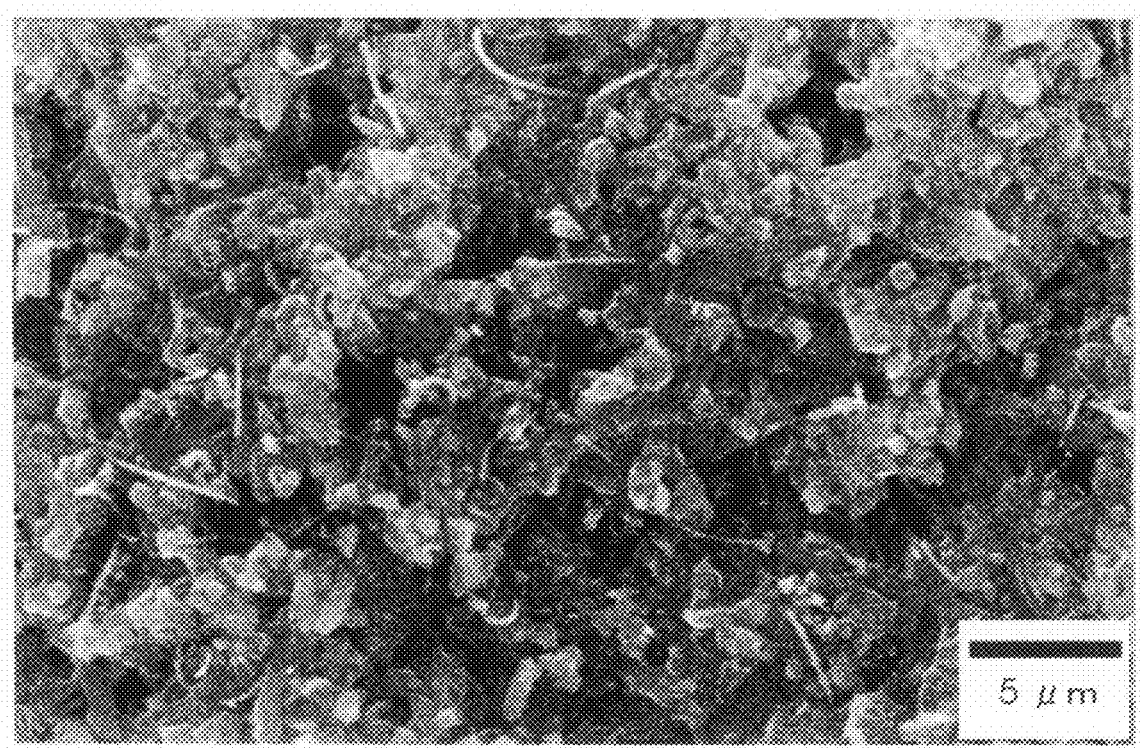
FIG. 1 shows a photograph of scanning electron microscope of a sintered silicon nitride (Example 1).

The sintered silicon nitride of the present invention is conductive because of containing CNT, is retaining denseness and is high-density in spite of containing CNT. Consequently, the wear resistant materials comprising these sintered silicon nitride are able to have the characteristics that said materials are rid of static adhesion of fine powders because of conductivity and are highly wear resistant. Usually, degree of sintering of the system containing CNT is low and it is difficult to achieve densification by the use of conventional sintering method. However, it is valuable for industrial application that the method of the present invention enables densification in the system containing CNT.

DETAILED DESCRIPTION OF THE INVENTION

Hereinafter, embodiments of the present invention will be explained.

The sintered silicon nitride of the present invention is produced by sintering of a mixture, wherein the mixture contains (1) 0.5 to 10 weight percent of rare-earth compounds converted to oxide base; and (2) 0.1 to 5 weight percent of aluminum oxide or the precursor; and (3) 0 to 5 weight percent of aluminum nitride; and (4-1) 0.1 to 5 weight percent converted to equimolar titanium nitride base from oxides of titanium group elements or titanium group compounds changing to nitrides of titanium group elements by sintering, or (4-2) 0.1 to 5 weight percent of magnesium oxide; and (5) remnant comprising silicon nitride powder with average grain diameter of less than 1.0 μm composed of less than 1.7 weight percent of oxygen content and composed of more than 90 weight percent of α phase type silicon nitride; and further contains (6) 0.3 to 12 weight percent of CNT relative to 100 weight percent of the previous mixture (1 to 5).

There are α-phase type and β-phase type of silicon nitride as raw materials. Although both types are possible, the content of α-phase type silicon nitride is preferably more than 45%. Particularly, it is preferable to use silicon nitride powder containing more than 90 weight percent of α-phase type silicon nitride. Silicon nitride base powder has preferably average grain diameter of less than 1.0 μm and the oxygen content of silicon nitride powder is preferably less than 1.7 weight percent. The greater strength of sintered silicon nitride with small porosity and maximum pore size is easily obtained by the use of fine silicon nitride powder with least impurities. Average grain diameter of silicon nitride base powder is preferably in the range of 0.4 to 0.8 μm. Also, the oxygen content is preferably in the range of 0.5 to 1.5 weight percent.

The content of silicon nitride in sintered material obtained by the use of the above raw materials is generally 75 to 97 weight percent and preferably 80 to 95 weight percent. Decrease in the content of silicon nitride results in increase of the amount of sintered additives relative to silicon nitride and is inclined to lower the properties, such as bending strength, toughness, wear resistance and the like, of sintered material. On the other hand, increase in the content of silicon nitride results in relatively lowering of the amount of sintered additives and in inadequate densification.

There are no restrictions on rare-earth compounds, but any one of oxidant, nitride, boride, carbide or silicate of yttrium (Y), lunthanum (La), cerium (Ce), samalium (Sm), neodium (Nd), dysprosium (Dy) or erbium (Er) is preferable. Particularly, oxidants of Y, Ce, Sm, Nd or Er are preferably used, because of their easily forming the grain boundary phase composed mainly of Si—R—Al—O—N compounds (R represents rare-earth compounds), Si—R—Mg—Al—O—N compounds or Si—R—Mg—O—N compounds (R represents rare-earth compounds).

The precursor of aluminum oxide such as transitional alumina and carbonate may be used as aluminum oxide. These aluminum compounds easily form Si—R—Al—O—N (R represents rare-earth compounds) compounds during sintering.

Addition of both aluminum oxide and aluminum nitride easily forms the grain boundary phase composed mainly of Si—R—Al—O—N compounds (R represents rare-earth compounds), and addition of aluminum oxide and/or aluminum nitride easily forms the grain boundary phase composed mainly of Si—R—Mg—Al—O—N compounds (R represents rare-earth compounds).

Since a part of Al and oxygen is soluble in solid $Si_3N_4$ by replacement to form sialon, a part of silicon nitride grains in sintered silicon nitride is present as sialon.

Addition of rare-earth compounds and aluminum compounds (including aluminum oxide and aluminum nitride) is not particularly restricted as long as the amount of the grain boundary phase composed mainly of Si—R—Al—O—N compounds (R represents rare-earth compounds) in sintered silicon nitride is finally in the range of 2 to 20 weight percent. However, addition of rare-earth compounds is preferably in the range of 0.5 to 10 weight percent converted to oxide base and addition of aluminum compounds is preferably in the range of 0.1 to 10 weight percent. Addition of aluminum nitride is preferably less than 7 weight percent, more preferably 0 to 5 weight percent and most preferably 0.5 to 5 weight percent. On the other hand, addition of aluminum oxide is preferably in the range of 0.1 to 5 weight percent.

Fine powders with average grain diameter of less than 1 µm as rare-earth compounds and aluminum compounds are preferably used.

Use of rare-earth compounds and aluminum compounds as sintering additives enable to form easily the grain boundary phase composed of Si—R—Al—O—N compounds (R represents rare-earth elements). Furthermore, use of aluminum oxide and/or aluminum nitride in addition to rare-earth oxide-magnesia as sintering additives as needed enables to form easily the grain boundary phase composed of Si—R—Mg—Al—O—N compounds or Si—R—Mg—O—N compounds (R represents rare-earth elements).

The sintered silicon nitride of the present invention contains 2 to 20 weight percent, preferably 5 to 15 weight percent of the grain boundary phase containing mainly Si—R—Al—O—N compounds, Si—R—Mg—O—N compounds or Si—R—Mg—Al—O—N compounds (R represents rare-earth elements). Since the content of less than 2 weight percent of grain boundary phase results in inadequate densification of sintered silicon nitride, porosity is increased, and bending strength, fracture toughness and the like are lowered. On the contrary, the content of more than 20 weight percent of grain boundary phase results in excessive grain boundary phase and causes lowered bending strength, fracture toughness and rolling life duration of sintered silicon nitride as it is applied to slide members. It is possible to measure the content of grain boundary phase by X-ray microanalyzer (EPMA). The amount will be converted from the cross section.

Titanium group elements include titanium, hafnium and zirconium. These elements will be used as oxides and also as carbonates and nitrates, which could be converted to oxides during sintering process. These increase sinterability and do not lower properties of silicon nitride sintering material. These become nitrides of titanium group elements by sintering.

Particularly, titanium oxide among them accelerates densification during sintering processes, and therewith titanium oxide finally changes to titanium nitride, precipitates as spherical grains at grain boundary and increases sliding property.

$TiO_2$ may be either rutile or anatase type, but to stretch a point, anatase type is much effective.

Fine powders with average diameter of less than 1.0 µm are preferably used. Addition of oxide of titanium group elements is depend on the addition of CNT and application purpose, but is generally 0.1 to 5.0 weight percent. Addition of more than 6 weight percent results densification in difficulty.

The sintered silicon nitride of the present invention may contain other components than above description. For example, oxide, nitride, boride or silicide of tungsten (W) and the like, or silica may be included. The content of total of these compounds is preferably in the range of 0.1 to 5 weight percent.

Carbon nanotubes (CNT) represent carbon based fiber with a few branches and with hollow structure described in U.S. Pat. Nos. 4,663,230, 5,165,909, 5,171,560, 5,578,543 5,589, 152, 5,650,370, 6,235,674 and the like. The size of CNT has generally, diameter of 0.4 to 200 nm and longitudinal diameter of 1 to 1000 µm, and preferably diameter of 20 nm and longitudinal diameter of 100 to 500 µm. Addition of CNT is generally 0.3 to 12 weight percent (based on the weight of sintered silicon nitride not containing CNT), and preferably 1.2 to 4.2 weight percent. The conductivity could be controlled by the amount of additives. A smaller amount of CNT results in good sinterability but in lower conductivity with $10^{-1}\Omega^{-1}m^{-1}$. On the contrary, a larger amount of CNT lowers sinterability and is not preferable. The conductivity of sintered material could be determined in the range, for example, of $10^{-1}$ to $10^4\Omega^{-1}m^{-1}$ by controlling the addition of CNT depending on the application.

Then, the production processes of the present invention are explained. There are not particular restrictions on the production processes, but generally the following processes are the fundamental processes:

First of all, the fundamental composition is $Si_3N_4$ (85 to 97 weight percent)-$Y_2O_3$ (0.5 to 10 weight percent)-$Al_2O_3$ (0.1 to 5 weight percent)-$TiO_2$ (or $HfO_2$, $ZrO_2$ and the like)(0.1 to 5 weight percent)-CNT (0.3 to 12 weight percent) or $Si_3N_4$ (85 to 97 weight percent)-$Y_2O_3$ (0.5 to 10 weight percent)-MgO (0.1 to 5 weight percent) (or $Al_2O_3$ and/or AlN (0.1 to 5 weight percent))-CNT (0.3 to 12 weight percent).

A typical production processes are described as follows:

Specified amount of various additive powders is added to silicon nitride base powder, and organic binder and carrier medium are added and mixed well. Then, the raw mixture is formed to a desired green material by the application of known forming methods, like single shaft pressing and rubber pressing. It is necessary to avoid from aggregation of various fine grains and to disperse them homogeneously during the mixture of various base powders. Thereby, increasing sintering-acceleration effect could be expected.

Then, the green material as formed above is treated with degreasing to prepare degreased green material. A sintered silicon nitride is obtained by sintering the degreased green bodies at 1600 to 1900° C., preferably at 1750 to 1850° C. A lower sintering temperature may result in slow densification and a higher sintering temperature tends to decompose silicon nitride.

Various sintering processes, such as normal pressure sintering, pressure sintering (hot pressing), ambient pressure sintering, HIP (hot isostatic pressure sintering), are applicable.

Moreover, to form higher-density sintered material and to remove defects controlling the strength of sintered material, several methods, such as HIP treatment after normal pressure sintering, may be incorporated. Methods could be selected depending on the purpose, and normal pressure sintering or ambient pressure sintering is preferable from cost aspect.

It is particularly preferable to apply hot isostatic pressing to the obtained sintered silicon nitride with more than 30 MPa at 1600 to 1850° C. under non-oxidizing ambient after the previous sintering.

The sintered silicon nitride thus obtained has preferably the following properties. CNT localizes mainly near grain boundary, the aspect ratio is 500 to 10000 and the content is in the range of 3 to 12 weight percent.

The conductivity is in the range of $10^{-1}$ to $10^2 \, \Omega^{-1} \, m^{-1}$.

The porosity of the sintered silicon nitride is less than 1.5 mass percent and the maximum pore size is less than 2 μm.

Three-point bending strength of the sintered silicon nitride is more than 600 MPa and the value of fracture toughness is more than 5 MPa·m$^{1/2}$.

EXAMPLES

The following Examples are provided to illustrate the present invention, but are not intended to limit the scope thereof.

Example 1

To 92 weight percent of Si$_3$N$_4$ (silicon nitride) base powder (UBE Industries, LTD; E-10) with 1.3 weight percent of oxygen content containing 97 weight percent of α-type silicon nitride with average grain diameter of 0.55 μm, 5 weight percent of Y$_2$O$_3$ (yttrium oxide) powder (Shin-Etsu Chemical Co., LTD) with average grain diameter of 0.9 μm as sintering additives and 3 weight percent of Al$_2$O$_3$ (Alumina) powder (Sumitomo Chemical Co., LTD; AKP-50) with average grain diameter of 0.7 μm were weighed and added, and then 5 weight percent of TiO$_2$ (titanium oxide) powder (Sakai Chemical Co., LTD) with average grain diameter of 0.2 μm and 5 weight percent of AlN (aluminium nitride) with average grain diameter of 1.0 μm relative to 100 weight percent of the above mixture were weighed and were added. Still furthermore, 1.8 weight percent of CNT relative to 100 weight percent of the above mixture was weighed. These grains are subjected to wet blending by silicon nitride balls in ethyl alcohol for 96 hrs to prepare a raw mixture after dryness.

Blended granulated powder was prepared by adding a specified quantity of organic binder to the above raw mixture, and then formed at 50 MPa forming pressure to prepare many circular disk-type green bodies with diameter of 15 mm×thickness of 5 mm and diameter of 25 mm×thickness of 5 mm as samples for bending strength test.

After each green material was degreased under air flow at 450° C. for 4 hrs, it was hold under 0.1 MPa nitrogen gas atmosphere at 1350° C. for 1 hr, sintered under 0.9 MPa nitrogen gas atmosphere at 1800° C. for 2 hrs, then treated with HIP with the condition of 100 MPa nitrogen gas atmosphere at 1700° C. for 1 hr and made to sintered silicon nitride.

The grain boundary phase of the sintered silicon nitride was analyzed by X-ray microanalyzer (JEOL, LTD) and it was found that the fraction of Si—Y—Al—O—N compounds as a main component was about 13 weight percent.

Furthermore, the prepared granulated powder was preformed spherically by a metal mold, rubber-pressed at 98 MPa forming pressure, and prepared many spherical green bodies with diameter of 11 mm as samples for crush strength and rolling life duration test.

The green material was subjected to degreasing, heat-treatment (holding treatment), sintering and HIP treatment under the same condition as described, and became dense sintered material. Then, the sintered material after HIP treatment was subjected to polish to prepare balls with diameter of 9.52 mm and surface roughness (Ra) of 0.01 μm and was prepared wear resistant materials by silicon nitride enabled to use for bearing rails. The surface roughness (Ra) was 0.004 μm. Ra is average roughness of centerline obtained by measuring equator of balls by an instrument for measuring surface roughness-profile method.

Examples 2~18

The raw mixture was prepared by blending silicon nitride raw powder used in Example 1, Al$_2$O$_3$ powder, AlN powder, rare-earth oxide, R'O$_2$ powder (R' represents titanium group elements), conductive CNT and the like at the composition ratio shown in the below table (Table 1), and prepared sintered silicon nitride as described in Example 1. The precise condition of sintering is described in notes of the table.

Comparative Example 1~3

In Comparative Example 1, a sintered silicon nitride was prepared by the same condition to Example 1 other than absence of CNT and similarly silicon nitride balls were prepared.

In Comparative Example 2, a sintered silicon nitride was prepared by the same condition to Example 1 other than addition of 13 weight percent of CNT.

In Comparative Example 3, a sintered silicon nitride was prepared by the same condition to Example 1 other than absence of titanium oxide and aluminum nitride.

The composition and properties of each silicon sintered material obtained in the Examples and the Comparative Examples are shown in Table 1.

TABLE 1

| No. | Composition* (wt %) | | | | | | | Properties | | | |
| | Si$_3$N$_4$ (0.55 μm) | R$_2$O$_3$ (0.9 μm) | Al$_2$O$_3$ (0.7 μm) | R'O$_2$ (0.2 μm) | AlN (1.0 μm) | CNT | Sintering condition etc.*** | Density | Three-point bending strength (Mpa) | Fracture toughness (MPam$^{1/2}$) | Conductivity (Sm$^{-1}$) |
| --- | --- | --- | --- | --- | --- | --- | --- | --- | --- | --- | --- |
| Example 1 | 92 | 5 (Y$_2$O$_3$) | 3 | 5 (TiO$_2$) | 5 | 1.8 | 1 | 99.7 | 1100 | 6.2 | 15 |
| Example 2 | 92 | 5 (Y$_2$O$_3$) | 3 | 5 (TiO$_2$) | 5 | 1.8 | 2 | 98.5 | 950 | 5.9 | 8 |
| Example 3 | 92 | 5 (Y$_2$O$_3$) | 3 | 5 (TiO$_2$) | 5 | 1.0 | 1 | 99.8 | 1070 | 6.3 | 5 |
| Example 4 | 92 | 5 (Y$_2$O$_3$) | 3 | 5 (TiO$_2$) | 5 | 1.0 | 2 | 98.8 | 980 | 6.3 | 3 |
| Example 5 | 91 | 6 (Y$_2$O$_3$) | 3 | 5 (TiO$_2$) | 5 | 5.0 | 1 | 98.0 | 890 | 6.0 | 8 |
| Example 6 | 91 | 6 (Y$_2$O$_3$) | 3 | 5 (TiO$_2$) | 5 | 5.0 | 3 | 99.8 | 1150 | 6.3 | 11 |
| Example 7 | 91 | 6 (Y$_2$O$_3$) | 3 | 5 (TiO$_2$) | 5 | 8.0 | 4 | 97.5 | 830 | 5.9 | 10 |
| Example 8 | 91 | 6 (Y$_2$O$_3$) | 3 | 5 (TiO$_2$) | 5 | 12.0 | 1 | 92.0 | 800 | 5.8 | 10 |

TABLE 1-continued

| No. | Composition* (wt %) | | | | | | Properties | | | |
|---|---|---|---|---|---|---|---|---|---|---|
| | | | | | | | | Three-point | | |
| | $Si_3N_4$ (0.55 μm) | $R_2O_3$ (0.9 μm) | $Al_2O_3$ (0.7 μm) | $R'O_2$ (0.2 μm) | AlN (1.0 μm) | CNT | Sintering condition etc.*** | Density | bending strength (Mpa) | Fracture toughness (MPam$^{1/2}$) | Conductivity (Sm$^{-1}$) |
| Example 9 | 92 | 5 ($Y_2O_3$) | 3 | 5 ($TiO_2$) | 5 | 3.0 | 5 | 99.5 | 1020 | 6.2 | 12 |
| Example 10 | 92 | 5 ($Yb_2O_3$) | 3 | 5 ($TiO_2$) | 5 | 1.8 | 1 | 99.6 | 1100 | 6.0 | 15 |
| Example 11 | 92 | 5 ($Y_2O_3$) | 3 | 5 ($HfO_2$**) | 5 | 1.8 | 1 | 99.2 | 1060 | 6.5 | 11 |
| Example 12 | 92 | 5 ($Y_2O_3$) | 3 | 5 ($HfO_2$**) | 5 | 6.0 | 3 | 97.0 | 880 | 6.2 | 8 |
| Example 13 | 85 | 10 ($Y_2O_3$) | 5 | 5 ($TiO_2$) | 5 | 1.8 | 6 | 99.5 | 980 | 6.8 | 14 |
| Example 14 | 97 | 2 ($Y_2O_3$) | 1 | 5 ($TiO_2$) | 5 | 1.8 | 3 | 98.5 | 920 | 5.6 | 9 |
| Example 15 | 92 | 5 ($Y_2O_3$) | 3 | 5 ($ZrO_2$) | 5 | 1.8 | 7 | 99.2 | 1010 | 5.9 | 9 |
| Example 16 | 92 | 5 ($Y_2O_3$) | 3 | 1 ($ZrO_2$) | 5 | 1.8 | 1 | 99.4 | 1020 | 5.6 | 5 |
| Example 17 | 92 | 5 ($Nd_2O_3$) | 3 | 5 ($TiO_2$) | 5 | 1.8 | 1 | 98.9 | 980 | 6.1 | 5 |
| Example 18 | 94.9 | 5 ($Y_2O_3$) | 0.1 | 5 ($TiO_2$) | 0.3 | 1.8 | 1 | 97.5 | 880 | 5.7 | 4 |
| Comparative Example 1 | 92 | 5 ($Y_2O_3$) | 3 | 5 ($TiO_2$) | 1 | 0.0 | 1 | 99.8 | 1080 | 6.2 | <10$^{-4}$ |
| Comparative Example 2 | 92 | 5 ($Y_2O_3$) | 3 | 5 ($TiO_2$) | 5 | 13.0 | 1 | 80.0 | 500 | 4.5 | 10 |
| Comparative Example 3 | 92 | 5 ($Y_2O_3$) | 3 | 0 | 0 | 1.8 | 1 | 92.0 | 620 | 4.7 | <10$^{-4}$ |

Notes)
R represents rare-earth elements and R' represents titanium group elements.
*The amount of R'O$_2$ and AlN expresses the weight relative to total weight 100 of Si$_3$N$_4$, R$_2$O$_3$ and Al$_2$O$_3$, and that of CNT expresses the weight relative to total weight 100 of Si$_3$N$_4$, R$_2$O$_3$, Al$_2$O$_3$, R'O$_2$ and AlN.
**0.3 μm grain diameter (HfO$_2$)
***Sintering condition etc. is as follows:
1: 1350° C., 1 h, 0.01MPaN$_2$→1850° C., 4 h, 0.07MPaN$_2$→1700° C., 1 h, 1000MPaN$_2$
2: The same to 1, except no HIP treatment.
3: 1800° C., 30MPa, 2 h, 0.9MPaN$_2$→1700° C., 1 h, 1000PaN$_2$.
4: The same to 3, except sintering temperature 1750° C.
5: The same to 1, except 1 weight percent of MgO is included.
6: The same to 1, except sintering temperature and time is 1750° C., 1 hr.
7: The same to 1, except sintering temperature and time is 1850° C., 1 hr.

As shown in Table 1, it is confirmed that all of the silicon nitride sintered bodies of the present invention assure excellent conductivity and keep holding the properties without lowering.

Figure 2:
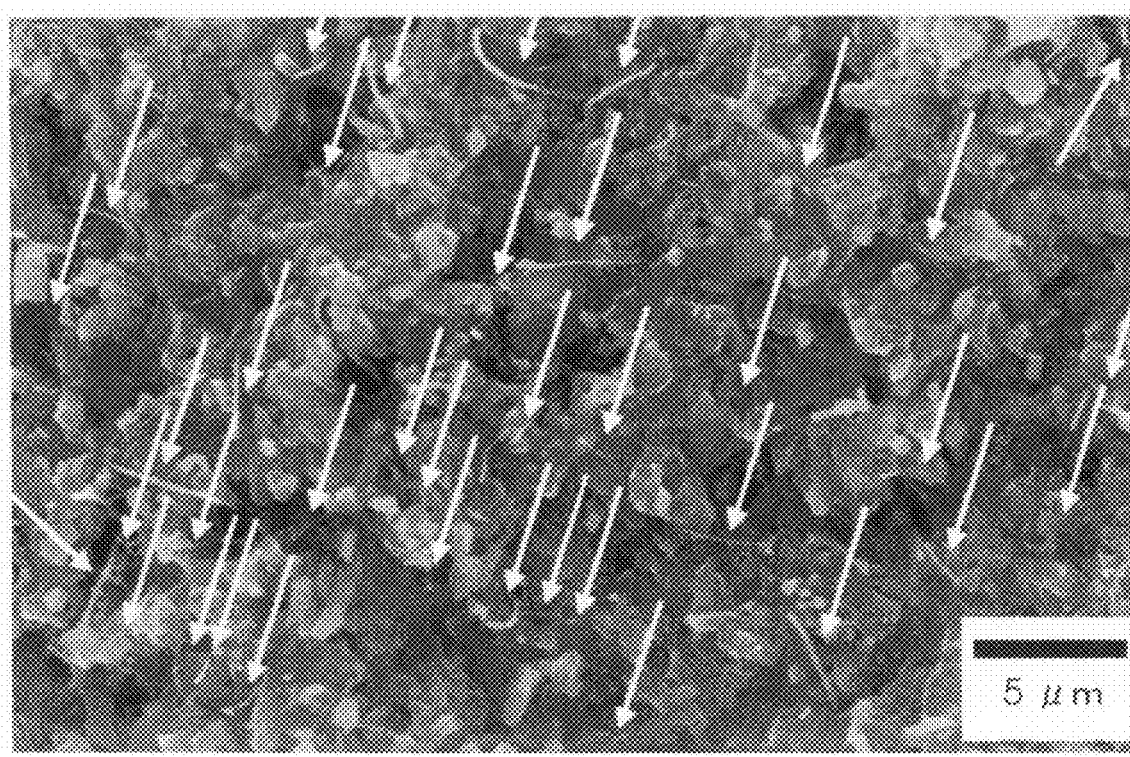
FIG. 2 is the same to FIG. 1. Arrowheads show CNT.

Evaluation of repetitive fatigue properties by indentation fracture method confirmed that the sintered bodies of Comparative Example 1 and Example 1 showed the same properties. Since the sintered material of Comparative Example 1 does not show conductivity, the sintered material of Example 1 has the advantage in wear of and in jamming by fine particles adhered by static electricity in the environment, where fine particles are flying. FIGS. 1 and 2 show the photographs of a sintered silicon nitride obtained in Example 1 by scanning electron microscope (JEOL, TSM-5200, the secondary electron image) and show that CNT is surrounded by grain boundary phase.

The sintered material of Comparative Example 2 showed conductivity but was insufficient in densification. Accordingly, both fracture toughness and bending strength are low and intended wear strength could not be obtained.

Figure 3:
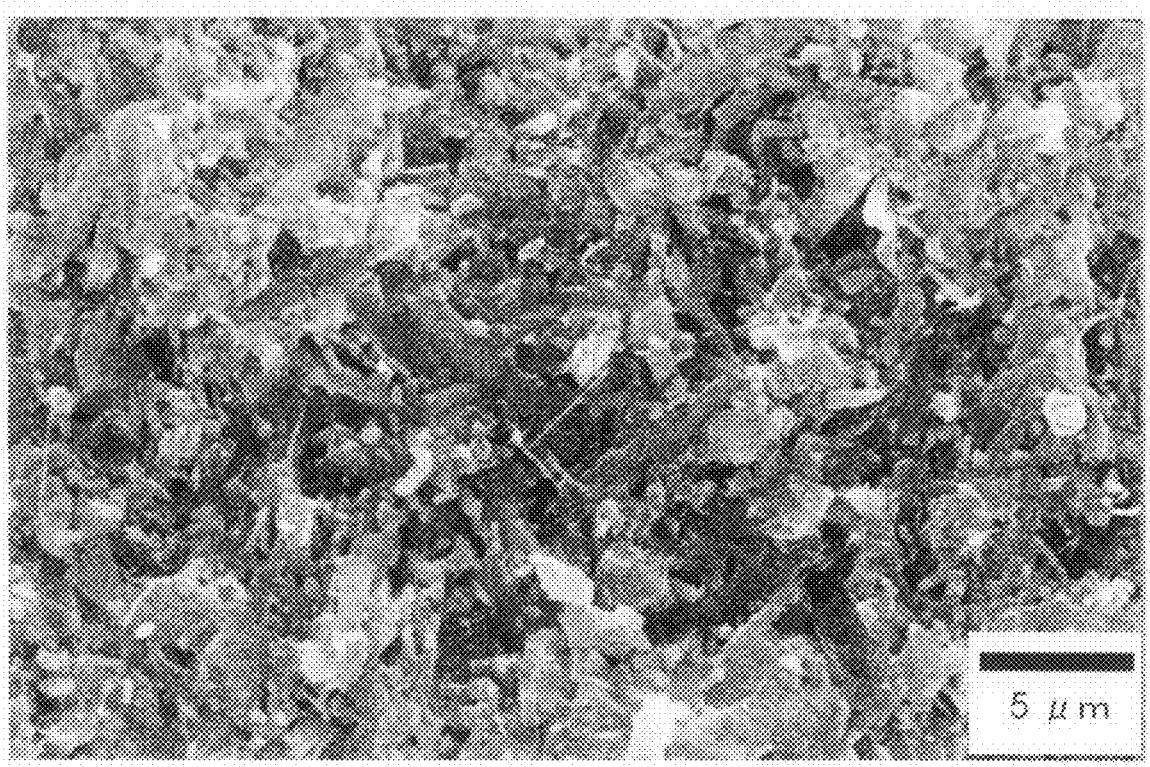
FIG. 3 shows a photograph of scanning electron microscope of a sintered silicon nitride (Comparative Example 3).

In Comparative Example 3, CNT was disappeared at a stage of insufficient densification. Therefore, generated silicon carbide did not show excellent mechanical properties. FIG. 3 shows a photograph of sintered silicon nitride obtained in Comparative Example 3 by scanning electron microscope and shows disappearance of CNT.

Still furthermore, the rolling life duration (time), i.e. the duration until the surface of silicon nitride ball is exfoliated, on silicon nitride balls obtained in Example 1 and Comparative Example 2 was measured under the condition of 5.9 GPa load/ball maximum contact stress, 1200 rpm revolution, and dip-feed lubrication of turbine oil by the method of rotating on a flat SUJ2 steel plate as an opposite plate prescribed by JIS G-4805 by the use of thrust type rolling abrasion test equipment. The results show excellent similar fatigue properties for both balls. Additionally, the conductivity of the sintered bodies of Example 1 and Comparative Example 1 are 10Ω$^{-1}$m$^{-1}$ and less than 1×10$^{-4}$Ω$^{-1}$m$^{-1}$, respectively.

The results are not shown, but both grain boundary phases are based on Si—R—Al—O—N compounds (R represents rare-earth compounds) and presence of corresponding compound was observed in the case of other additives for a part of above prepared sintered bodies. For example, addition of a compound containing titanium and hafnium induced changes after sintering as follows: TiO$_2$→TiN, HfO$_2$→HfN (O solid solution) or HfO$_2$ (Si, Y solid solution).

Example 19

To 92 weight percent of Si$_3$N$_4$ (silicon nitride) base powder (UBE Industries, LTD, E-10) with 1.3 weight percent of oxygen content and average grain diameter of 0.55 μm, sintering additives comprising 5 weight percent of Y$_2$O$_3$ (yttorium oxide) powder (Shin'etsu Chemical Co., LTD) with average grain diameter of 0.9 μm and 3 weight percent of Al$_2$O$_3$ (alumina) powder (Sumitomo Chemical Co,. LTD; AKP-50) with average grain diameter of 0.7 μm were weighed and mixed. Then, to 100 weight percent of above mixture, 2.5 weight percent of MgO (magnesia) powder (Ube Chemical Co,. LTD) with average grain diameter of 0.2 μm and 5 weight percent of AlN (aluminum nitride) with average grain diameter of 1.0 μm were weighed and added. Furthermore, to 100 weight percent of the above mixture, 1.8 weight percent of CNT was weighed. The mixture was subjected to wet blending by the use of silicon nitride balls in ethanol for 96 hrs to prepare a raw mixture after dryness.

Specified quantity of organic binder was added to the raw mixture to prepare blended granulated powder, and then it was press-formed by 50 MPa compacting pressure to prepare many circular disk-type green bodies with diameter of 15 mm×thickness of 5 mm and diameter of 25 mm×thickness of 5 mm as samples for bending strength test.

After each forms was degreased under air flow at 450° C. for 4 hrs, it was hold under 0.1 MPa nitrogen gas atmosphere at 1350° C. for 1 hr, sintered under 0.9 MPa nitrogen gas atmosphere at 1800° C. for 2 hrs, then treated with HIP with the condition of 100 MPa nitrogen gas atmosphere at 1700° C. for 1 hr and made to sintered silicon nitride.

The grain boundary phase of the sintered silicon nitride was analyzed by X-ray microanalyzer (JEOL, LTD) and it was found that the fraction of Si—Y—Mg—Al—O—N compound as a main component was about 13 weight percent.

Examples 20~26

The silicon nitride base powder, magnesium oxide powder, $Al_2O_3$ powder, AlN powder, rare-earth oxide powder, conductive CNT used in Example 19 are blended to prepare raw mixtures with the composition shown in the following table (Table 2) and prepared silicon nitride sintered bodies similarly as described in Example 19. The precise conditions for sintering are described in the notes of the table.

addition of magnesium oxide. There were no preferable results as obtained in the present invention.

What we claim is:

1. A sintered silicon nitride with a conductivity of higher than $10^{-1}\Omega^{-1} m^{-1}$ produced by (a) preparing a mixture, comprising 0.5 to 10 weight percent of rare-earth compounds in terms of oxide, 0.1 to 5 weight percent of aluminum oxide or its precursor, 0 to 5 weight percent of aluminum nitride, 0.1 to 5 weight percent of oxides of titanium group or other titanium group compounds in terms of equimolar titanium nitride wherein the titanium group compounds can be converted to nitrides of titanium group elements by sintering, and silicon nitride powder as a balance, and further comprising 0.3 to 12 weight percent of carbon nanotubes (CNT) relative to 100 weight percent of the foregoing mixture, wherein the silicon nitride powder has an average grain diameter of less than 1.0 μm and contains less than 1.7 weight percent of oxygen content and more than 90 weight percent of alpha phase type silicon nitride, and (b) sintering the mixture by a non pressure sintering method or an ambient pressure sintering method.

2. The sintered silicon nitride of claim 1, comprising a matrix phase of crystal grains composed of silicon nitride and a grain boundary phase composed mainly of Si—R—Al—O—N compounds, wherein R represents rare-earth elements.

TABLE 2

| | Composition* (wt %) | | | | | | Properties | | | |
| | | | | | | | | Three-point | | |
| No. | $Si_3N_4$ (0.55 μm) | $R_2O_3$ (0.9 μm) | $Al_2O_3$ (0.7 μm) | AlN (10 μm) | MgO (0.2 μm) | CNT | Sintering condition etc.** | Density (%) | bending strength (Mpa) | Fracture toughness (MPam$^{1/2}$) | Conductivity (Sm$^{-1}$) |
|---|---|---|---|---|---|---|---|---|---|---|---|
| Example 19 | 92 | 5 | 3 | 5 | 2.5 | 1.8 | 1 | 99.2 | 800 | 5.3 | 14 |
| Example 20 | 92 | 5 | 3 | 5 | 2.5 | 1.8 | 2 | 98.0 | 750 | 5.2 | 7 |
| Example 21 | 92 | 5 | 3 | 5 | 2.5 | 1.0 | 1 | 99.3 | 850 | 5.7 | 6 |
| Example 22 | 92 | 5 | 3 | 5 | 2.5 | 1.0 | 2 | 98.3 | 760 | 5.5 | 5 |
| Example 23 | 92 | 5 | 3 | 0 | 2.5 | 1.8 | 1 | 99.0 | 840 | 5.5 | 8 |
| Example 24 | 94 | 6 | 0 | 5 | 2.5 | 1.8 | 1 | 97.5 | 700 | 5.1 | 5 |
| Example 25 | 94 | 6 | 0 | 0 | 2.5 | 1.8 | 1 | 99.2 | 820 | 5.7 | 7 |
| Example 26 | 94 | 6 | 0 | 0 | 2.5 | 1.8 | 3 | 99.1 | 810 | 5.6 | 7 |

Notes)
R represents rare-earth elements.
*The amount of AlN and MgO expresses the weight relative to total weight 100 of $Si_3N_4$, $R_2O_3$ and $Al_2O_3$, and that of CNT expresses the weight relative to total weight 100 of $Si_3N_4$, $R_2O_3$, $Al_2O_3$, MgO and AlN.
**Sintering condition etc. is as follows:
1: 1350° C., 1 h, 0.01MPa$N_2$→1850° C., 4 h, 0.07MPa$N_2$→1700° C., 1 h, 1000MPa$N_2$
2: The same to 1, except no HIP treatment.

It is recognized from Table 2 that all of the sintered silicon nitride of the present invention retain excellent conductivity. The result observed by the photograph of a sintered silicon nitride obtained in Example 19 by scanning electron microscope (JEOL, TSM-5200, the secondary electron image) shows that CNT is surrounded by grain boundary phase.

Comparative Example 4

For comparison, a sintered silicon nitride was prepared by the same condition to Example 19 other than absence of CNT and similarly silicon nitride balls were prepared. For the other comparison, moreover, a sintered silicon nitride was prepared with the addition of 13 weight percent of CNT, but without 3. The sintered silicon nitride of claim 1, wherein the mixture further comprises from 0.1 to 5 weight percent of at least one compound selected from magnesium and tungsten converted to oxide base.

4. The sintered silicon nitride of claim 1, comprising a matrix phase of crystal grains composed of silicon nitride and a grain boundary phase composed mainly of Si—R—Mg—O—N compounds or Si—R—Mg—O—N compounds, wherein R represents rare-earth elements.

5. The sintered silicon nitride of claim 1, wherein said CNT has a diameter of 0.4 to 200 nm and a longitudinal diameter of 1 to 1000 μm.

6. A method for producing a sintered silicon nitride with a conductivity of higher than $10^{-1}\Omega^{-1}m^{-1}$, comprising (a) forming a mixture into a desired shape and degreasing thereof, wherein the mixture comprises 0.5 to 10 weight percent of rare-earth compounds in terms of oxide, 0.1 to 5 weight percent of aluminum oxide or its precursor, 0 to 5 weight percent of aluminum nitride, 0.1 to 5 weight percent of oxides of titanium group with average grain diameter of less than 1.0 μm or other titanium group compounds in terms of equimolar titanium nitride wherein the titanium group compounds can be converted to nitrides of titanium group elements by sintering, and silicon nitride powder as a balance, and further comprising 0.3 to 12 weight percent of carbon nanotubes (CNT) relative to 100 weight percent of the previous mixture, wherein the silicon nitride powder has an average grain diameter of less than 1.0 μm and contains less than 1.7 weight percent of oxygen content and more than 90 weight percent of alpha phase type silicon nitride, and (b) sintering the shaped mixture at 1600 to 1900° C. by a normal pressure sintering method or an ambient pressure sintering method.

7. The method for producing sintered silicon nitride of claim 6, further comprising applying a hot isostatic pressing (HIP) to the sintered silicon nitride obtained by the previous sintering process at a pressure of more than 30MPa and a temperature of from 1600 to 1850° C. under a non-oxidizing atmosphere.

8. The sintered silicon nitride of claim 2, wherein the mixture further comprises from 0.1 to 5 weight percent of at least one compound selected from magnesium and tungsten converted to oxide base.

9. The sintered silicon nitride of claim 2, wherein said CNT has a diameter of 0.4 to 200 nm and a longitudinal diameter of 1 to 1000 μm.

10. The sintered silicon nitride of claim 3, wherein said CNT has a diameter of 0.4 to 200 nm and a longitudinal diameter of 1 to 1000 μm.

11. The sintered silicon nitride of claim 4, wherein said CNT has a diameter of 0.4 to 200 nm and a longitudinal diameter of 1 to 1000 μm.

12. The sintered silicon nitride of claim 8, wherein said CNT has a diameter of 0.4 to 200 nm and a longitudinal diameter of 1 to 1000 μm.

13. The sintered silicon nitride of claim 1 wherein said CNT has a diameter of 0.4 to 200 nm and a longitudinal diameter of 1 to 1000 μm.

* * * * *